United States Patent
Campbell

(10) Patent No.: US 9,132,753 B1
(45) Date of Patent: Sep. 15, 2015

(54) ENERGY ATTENUATING SEAT AND SEAT EXTENSION

(71) Applicant: Armorworks Enterprises LLC, Chandler, AZ (US)

(72) Inventor: Joshua Steven Campbell, Gilbert, AZ (US)

(73) Assignee: Armorworks Enterprises LLC, Chandler, AZ (US)

( * ) Notice: Subject to any disclaimer, the term of this patent is extended or adjusted under 35 U.S.C. 154(b) by 0 days.

(21) Appl. No.: 14/287,690

(22) Filed: May 27, 2014

Related U.S. Application Data

(60) Provisional application No. 61/828,283, filed on May 29, 2013.

(51) Int. Cl.
  *F41H 7/04* (2006.01)
  *B60N 2/427* (2006.01)
  *B60N 2/42* (2006.01)

(52) U.S. Cl.
  CPC ............ *B60N 2/42709* (2013.01); *B60N 2/427* (2013.01); *F41H 7/044* (2013.01); *F41H 7/046* (2013.01)

(58) Field of Classification Search
  CPC ....... F41H 7/046; F41H 7/02; B60N 2/42709; B60N 2/42736; B60N 2/506; B60N 2/42; B60N 2/4242; B60N 2/502; B60N 2/509; B60N 2/505; B60N 2/503; B60N 2/544; B60N 2/427; B60N 2/504; B60N 2/507; B60N 3/063; B60N 2/0868; B60N 2/16; B60N 2/1803; B60N 2/4214; B60N 2/42781; B60N 2/548; B60N 3/066; B60N 2/02; B60N 2/0276; B60N 2/074; B60N 2/10; B60N 2/1615; B60N 2/163; B60N 2/4228; B60N 2/4235; B60N 2/42745; B60N 2/4885; B60N 2/522; B60N 2/688; B60N 2/7082; B63G 9/00; B60R 22/24
  USPC ................. 89/36.8; 297/216, 216.17, 216.13, 297/216.15, 216.16, 216.18, 216.19
  See application file for complete search history.

(56) References Cited

U.S. PATENT DOCUMENTS

| | | | |
|---|---|---|---|
| 3,968,863 A | 7/1976 | Reilly | |
| 4,349,167 A | 9/1982 | Reilly | |
| 4,440,441 A | 4/1984 | Marrujo | |
| 5,125,598 A * | 6/1992 | Fox ............................ | 244/122 R |
| 5,676,336 A | 10/1997 | Nefy | |
| 6,561,580 B1 | 5/2003 | Bergey | |
| 6,585,190 B2 | 7/2003 | Mort | |
| 7,445,181 B2 | 11/2008 | Knoll | |
| 7,513,558 B2 | 4/2009 | Hansen | |
| 7,744,155 B2 * | 6/2010 | List et al. .................. | 297/216.17 |
| 8,840,163 B1 * | 9/2014 | Wilhelm et al. ................ | 296/19 |
| 2013/0214570 A1 * | 8/2013 | Grant et al. ................ | 297/216.1 |
| 2013/0221714 A1 * | 8/2013 | Greenwood et al. ....... | 297/216.1 |

* cited by examiner

*Primary Examiner* — Troy Chambers
*Assistant Examiner* — Bridget Cochran
(74) *Attorney, Agent, or Firm* — James L. Farmer

(57) ABSTRACT

Methods and apparatus are provided for an energy attenuating vehicle seat and seat extension. In one embodiment the seat and seat extension includes a substantially vertically oriented support column, at least one end of which is rigidly fixed to the vehicle structure. Upper and lower spaced apart seat mount bushings are attached to the seat and slidably mounted to the support column. An energy attenuating linkage connects the seat to the vehicle structure proximate an upper end of the support column. The seat may further include a seat extension platform pivotally connected at one end to the front of the seat, and the other end to an independent energy attenuating mount.

15 Claims, 11 Drawing Sheets

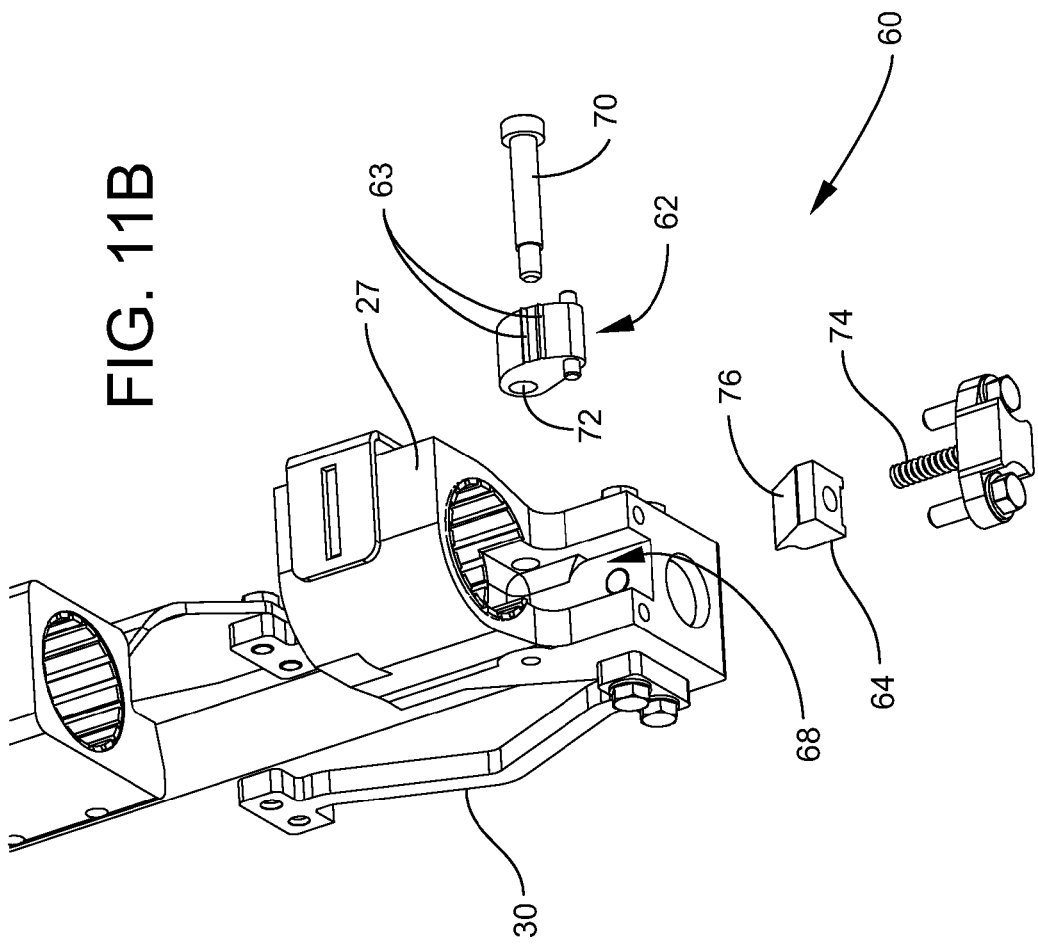
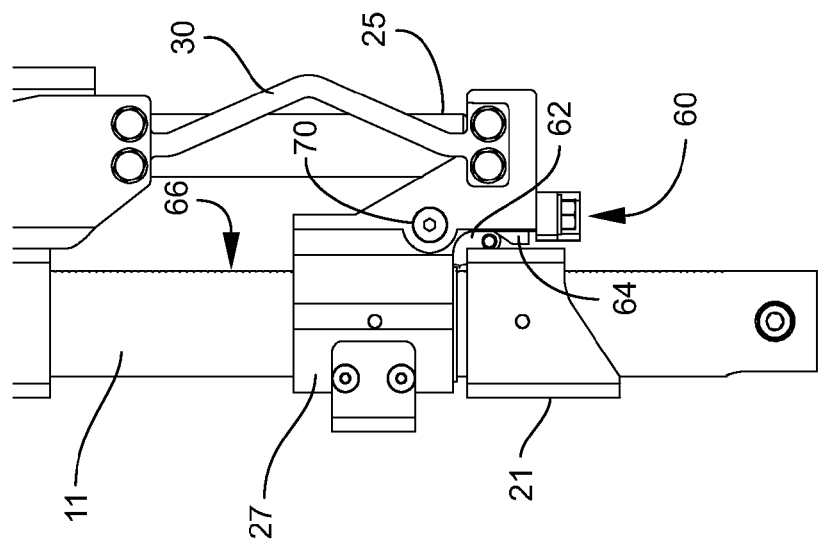

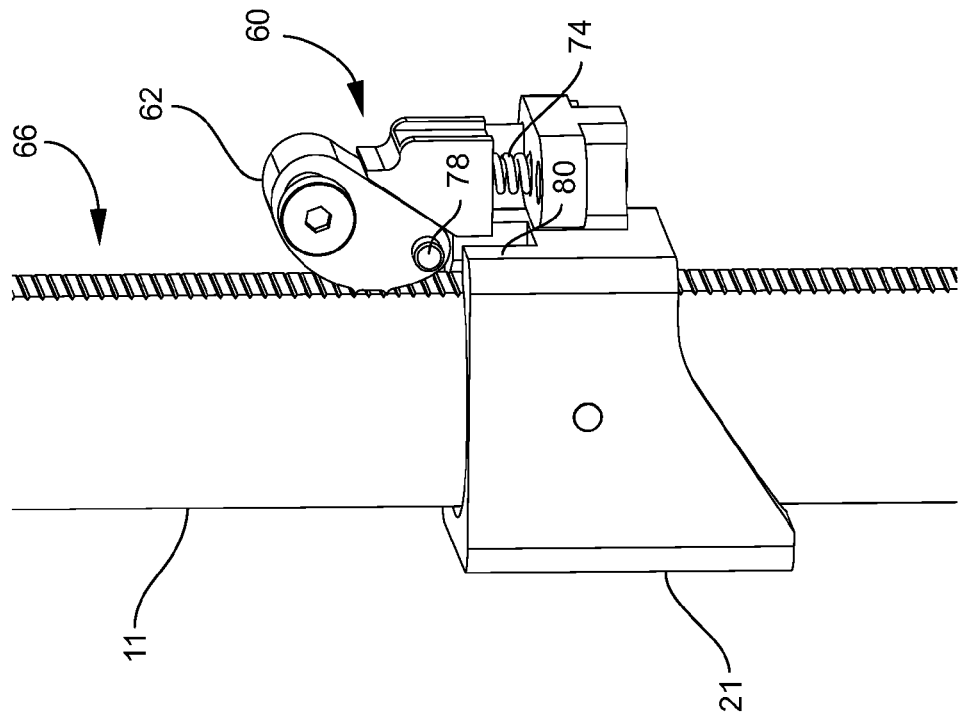
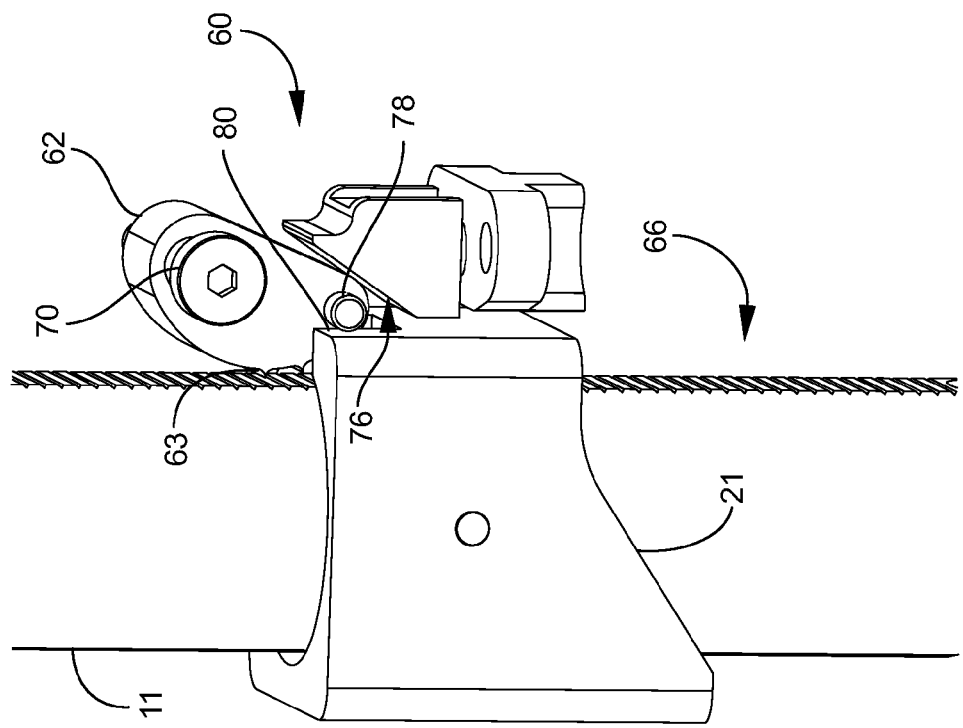

ENERGY ATTENUATING SEAT AND SEAT EXTENSION

TECHNICAL FIELD AND BACKGROUND

The technical field relates to energy attenuation ("EA") devices used to protect vehicle occupants in the event of a crash, explosion, mine blast, or other potentially catastrophic, high energy impulse event.

BRIEF DESCRIPTION OF THE DRAWINGS

In the accompanying drawings:

FIGS. 11a and 11b depict the failsafe lock mechanism built into the EA linkage in the main column; and FIGS. 12a and 12b show the failsafe lock mechanism in the unlocked and locked positions respectively.

DESCRIPTION OF THE EMBODIMENTS

Figure 1:
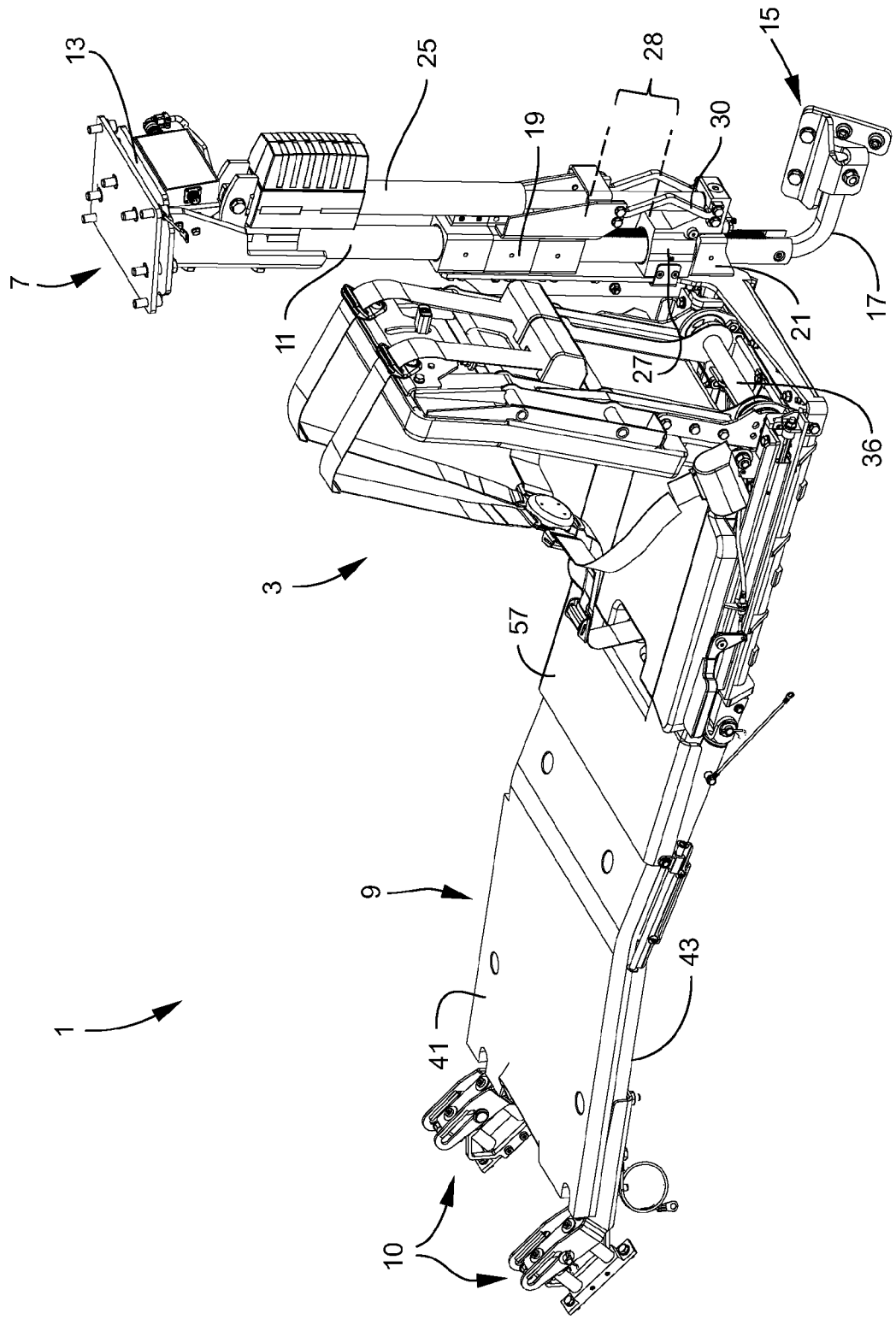
FIG. 1 is a perspective view of an EA seat and seat extension platform in accordance with the present disclosure.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list. Terms such as "connected" or "attached" as used herein are intended to denote direct, indirect (with intermediate elements), rigid, and flexible linking arrangements, as well as linking arrangements with one or more degrees of freedom. The term "vehicle" as used herein is intended to mean any person carrying structure, including but not limited to all types of land vehicles, aircraft, watercraft, rockets, spacecraft, and the like. As used herein, the term "aircraft" is intended to denote any airborne vehicle including but not limited to airplanes, jets, gliders, helicopters, and lighter-than-air craft.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now to the drawing figures, an exemplary energy attenuating ("EA") seat in accordance with the present disclosure is indicated generally at reference numeral 1. EA seats are typically employed to mitigate the severe shock loads associated with under vehicle mine blasts, helicopter crashes, or other impact type events involving sudden relative acceleration between the seat and the structure supporting the seat. Many EA seats utilize some form of deformable member between the seat and the structure supporting the seat to absorb the energy of the event. The EA mechanism is typically oriented to stroke in the direction of the anticipated shock load, such as toward the floor of a vehicle or aircraft, although additional EA supports may be included to account for shock loads from more than one direction. EA seats are disclosed for example in issued U.S. Pat. No. 7,938,485, and co-pending U.S. patent application Ser. Nos. 12/806,373, and 13/187,701, all of which are assigned to the assignee of the instant invention, and hereby incorporated by reference.

Figure 2:
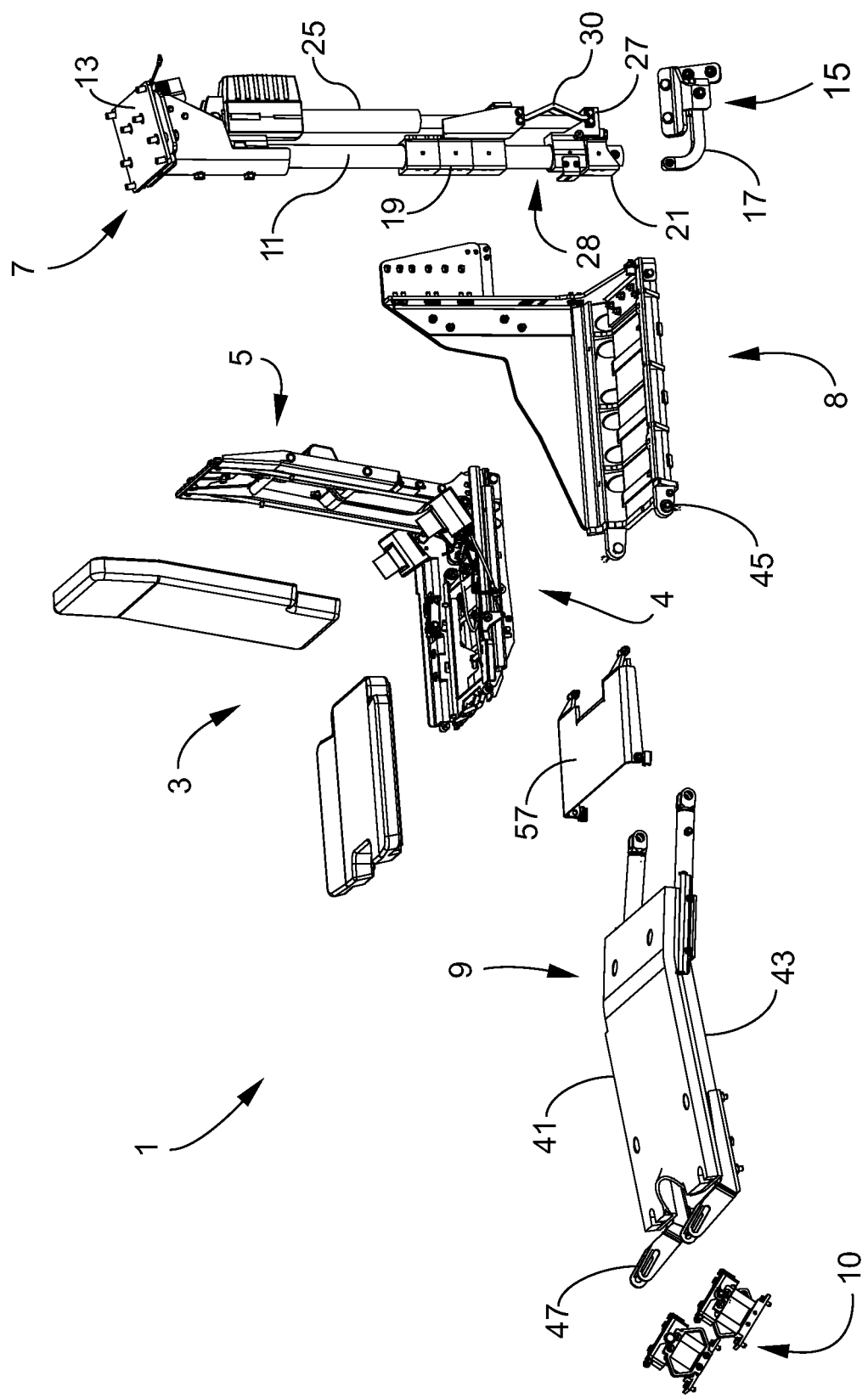
FIG. 2 is an exploded view of the EA seat and extension platform of FIG. 1.
Figure 3:
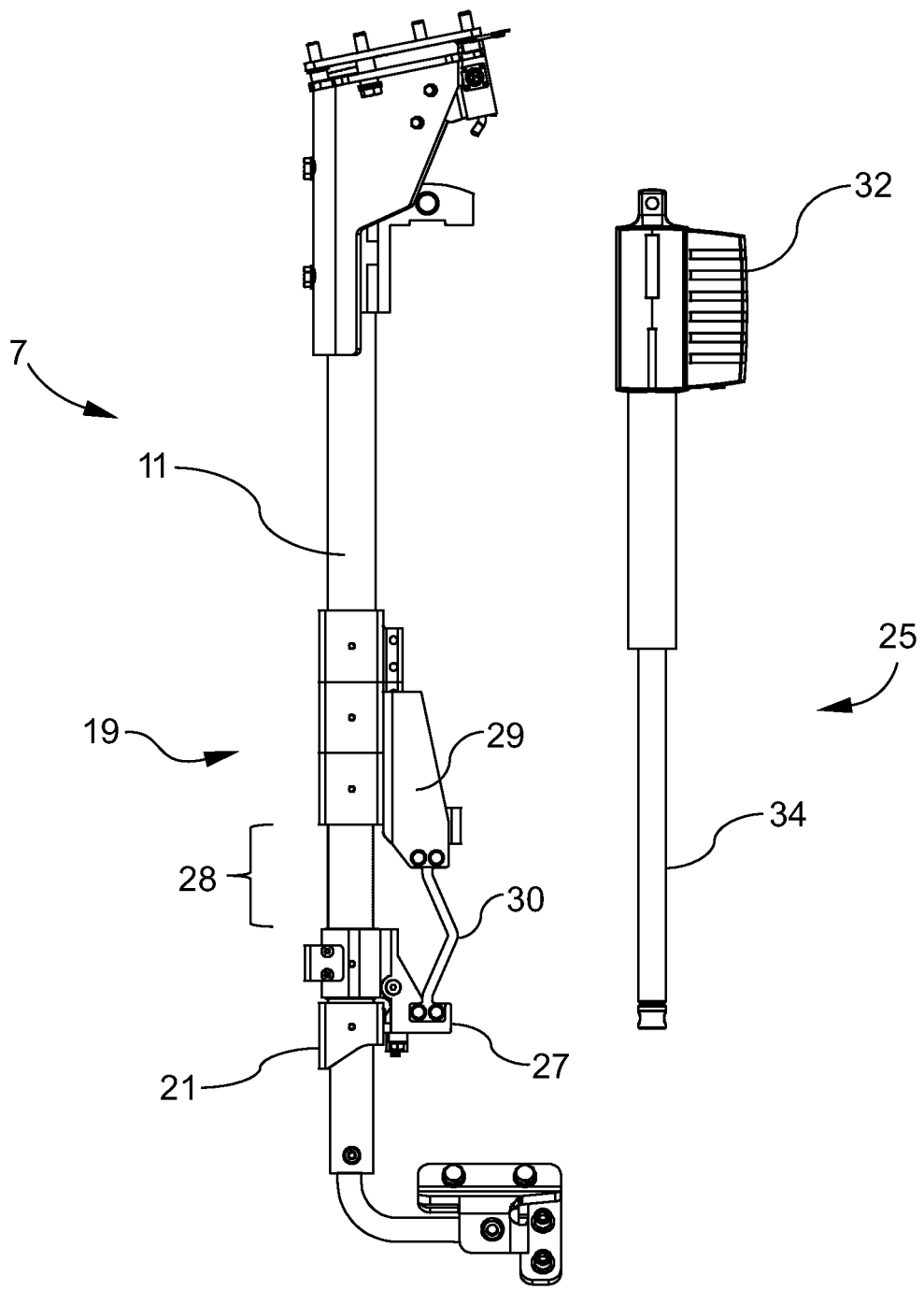
FIG. 3 is a side view of the main mount with the adjustable length support member shown separated from the main column.

Referring now to FIGS. 1 through 3, an exemplary EA seat and seat extension 1 in accordance with the present disclosure comprises generally a seat 3, a main mount 7, an extension platform 9, and forward EA mounts 10. The main mount 7 consists primarily of a vertical column 11 fixed at the top and bottom to structural elements of a vehicle compartment. In the depicted embodiment the upper end of the column 11 is fitted with a roof mounting bracket 13 that is adapted for attachment to a roof portion of the vehicle compartment, and the lower end of the column 11 is connected to a lower mount bracket 15 that is adapted for attachment to a lower portion or floor of the vehicle.

A pivot link 17 between the lower end of the column and the lower mount bracket 15 restrains against any lateral or fore-aft swinging of the lower end of the column 11, while allowing the bracket 15 to move upward relative to pole 11 and the roof bracket 13 if needed. This vertical degree of freedom provided by link 17 allows the main mount 7 to accommodate a certain amount of vehicle floor deformation from an externally applied force, such as from an under-vehicle mine blast, without pushing the column 11 upward against the vehicle roof. Thus a portion of the energy of a blast event may be absorbed through deformation of the vehicle floor before any significant load or acceleration is actually transmitted to the main mount 7. In this manner the link 17 and vehicle floor together serve as a portion of an energy absorbing mounting system that includes additional energy absorbing mechanisms built into the mount 7 described below.

Attached to column 11 is an upper seat mount bushing 19, and spaced below that a lower seat mount bushing 21, both adapted to slide along the length of column 11 with minimal friction. In the depicted embodiment, upper bushing 19 comprises three separate bushing elements stacked together, making upper bushing 19 approximately three times as long as lower bushing 21, however it should be appreciated that the quantity and length of bushing elements used in bushings 19 and 21 is at least in some sense a matter of design choice. For example, bushing 19 could instead be shorter than bushing 21, or comprise one long bushing element instead of three smaller elements stacked together.

Bushings 19 and 20 are both rigidly attached to a seat support bracket 8 which in turn holds and supports seat 3. The bushings 19, 21 and seat support bracket 8 thus moveably support the seat from column 11 in a cantilevered manner. To prevent the seat and bushings from simply sliding down column 11, the seat is also rigidly connected to the vehicle structure through a vertically adjustable, energy absorbing linkage. In one embodiment the linkage comprises an adjustable length support member 25 attached at an upper end to the roof mount bracket 13, a stabilizing bushing 27 attached to the lower end of support member 25 and slidably mounted to column 11 between upper and lower bushings 19, 21; and one or more rigid EA links 30 connecting the upper seat mount bushing 19 to the lower end of support member 25.

The above described elements of the energy absorbing linkage provide a direct load path between the seat support bracket 8 and the roof of the vehicle. In the particular embodiment depicted, the upper ends of the EA links 30 are connected to the upper seat support bushing 19 with a bracket 29; and the lower ends of EA links 30 are connected to the lower end of support member 25 with an integral flange portion of the stabilizing bushing 27.

The EA links 30 may comprise one or more crushable or extensible members that are initially rigid and strong enough to support the weight and G-loads of an occupied seat under non-extreme accelerations, yet capable of deforming in a controlled manner and absorbing the energy of a catastrophic impact event. In the depicted embodiment, each EA link 30 comprises an elongated bar with bends and straight sections, made of any generally rigid, yet deformable metal, such as aluminum or steel. Alternatively, EA link 30 may comprise any other crushable or extensible EA structure known in the art, such as crush tubes and the like. In addition, the EA link 30 may be custom tailored to any particular application by modifying material properties, thicknesses, and/or shapes. In one exemplary implementation the EA links may attenuate a vertical impact of a 6.5 meters-per-second impulse due to mine blast or improved explosive device (IED). An exemplary EA seat 1 may also be capable of withstanding road shock loads transmitted through a vehicle chassis structure of at least 10 G's vertical. Additional suitable EA link embodiments are disclosed in the above mentioned U.S. patents and patent applications owned by the assignee of the present invention, as well as U.S. Design patent application Ser. No. 29/386,211, also assigned to the assignee of the instant invention, the entire contents of which are hereby incorporated by reference. Although EA link 30 may protect a seated occupant for multiple impact events, they are generally considered disposable and easily replaced to restore a maximum level of protection to the EA seat.

Referring particularly to FIG. 3, the adjustable length support member 25 may be any adjustable, elongated structural element that is strong enough to withstand the downwardly directed loading applied to it by the seat during a blast or crash event. In one embodiment the support member 25 is an electrically powered, ball screw type linear actuator, comprising generally a controllable electric drive unit 32 and extendable shaft 34. By operating drive unit 32 to extend or retract shaft 34, the bushings 19, 21, 27, EA links 30, seat support bracket 8, and seat 3 can all be made to move in unison up and down along column 11 to place the seat in a desired vertical position.

While the weight of the seat applies a downward tension load to support member 25, the EA links 30 are in vertical compression. As mentioned above, when the load applied to the EA links 30 exceeds a certain threshold value, the links begin to plastically deform. Because the load is compressive in this case, the deformation causes the links to collapse and shorten, in turn allowing the seat along with upper and lower seat mount bushings 19, 21 to slide downward relative to the vertically held stabilizing bushing 27. The range of available downward motion, or "stroke", is exactly determined by the length of a gap 28 between the top of bushing 27 and bottom of bushing 19. Thus in a high energy impulse event, the downward movement of the seat will continue until the load impulse is completely absorbed by the collapsing EA links 30, or until the upper mount bushing 19 bottoms out against the stabilizing bushing 27, whichever occurs first.

Figure 5:
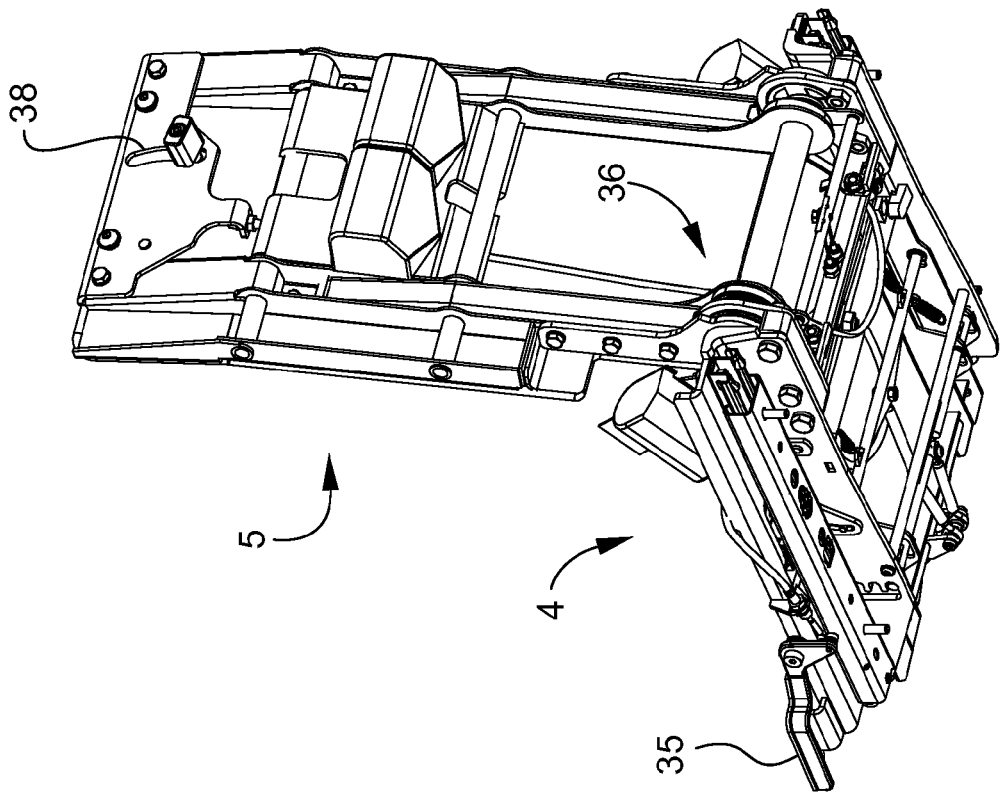
FIG. 5 is a rear perspective of the seat of FIG. 4.
Figure 4:
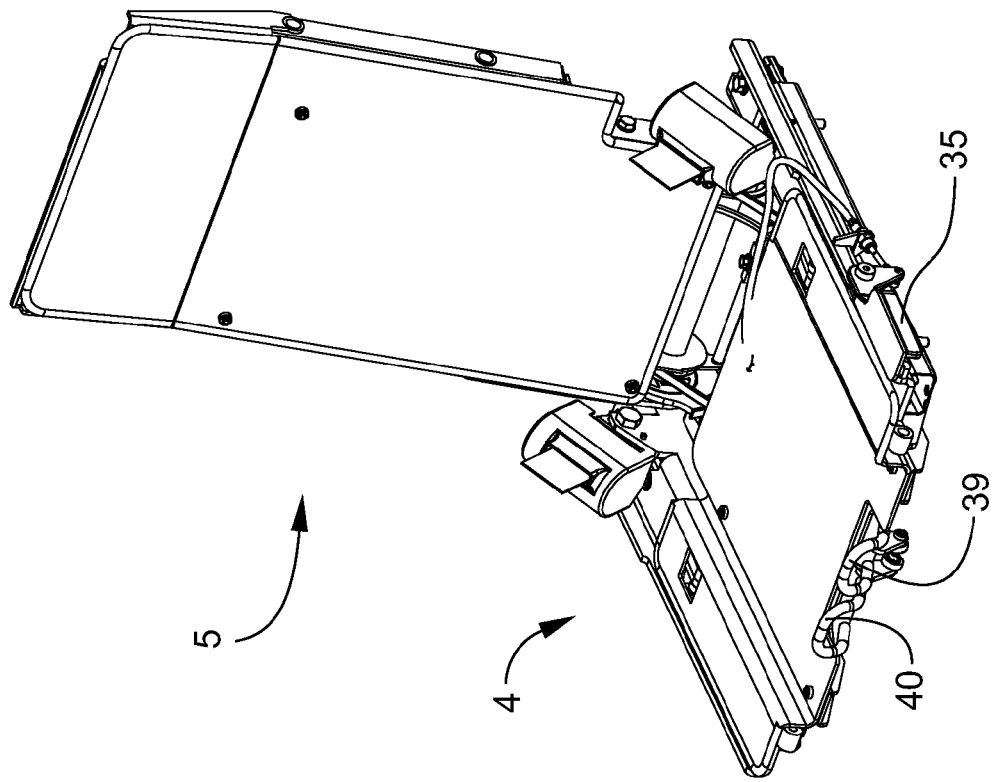
FIG. 4 is a forward perspective view of an exemplary seat for use in the EA seat and seat extension platform.

Referring to FIGS. 4 and 5, the seat 3 comprises a seat pan 4 that attaches to the seat support bracket 8, and a seat back 5 pivotally attached to the base 4. The angle of the seat back relative to the seat base 4 can be changed using either a seat back release lever 35 located alongside the seat base, or an emergency release handle 38 on the upper seat back. Both lever 35 and handle 38 serve to unlock a recline mechanism 36 located at the base of the seat back that releases the seat back.

Figure 6C:
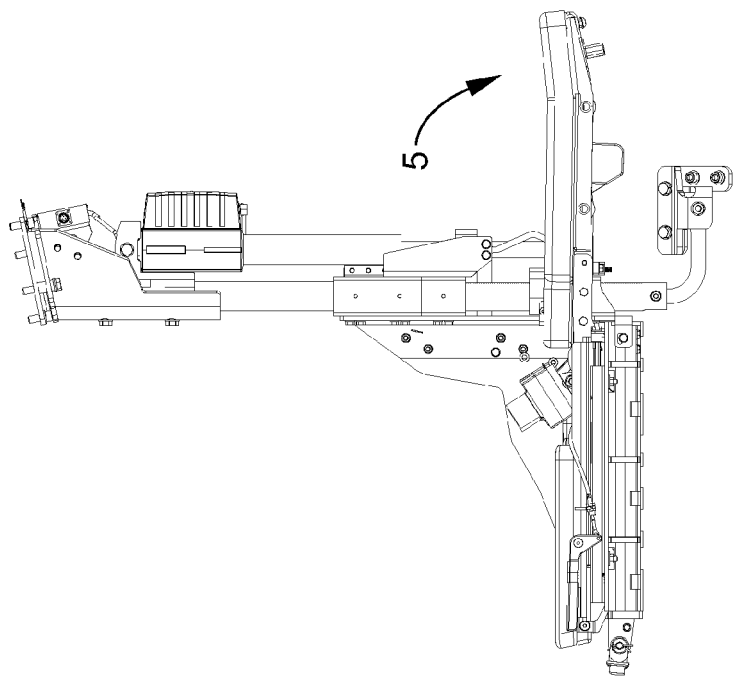
FIGS. 6a through 6c are side views showing the seat back portion of the EA seat at three different tilt angles.
Figure 6B:
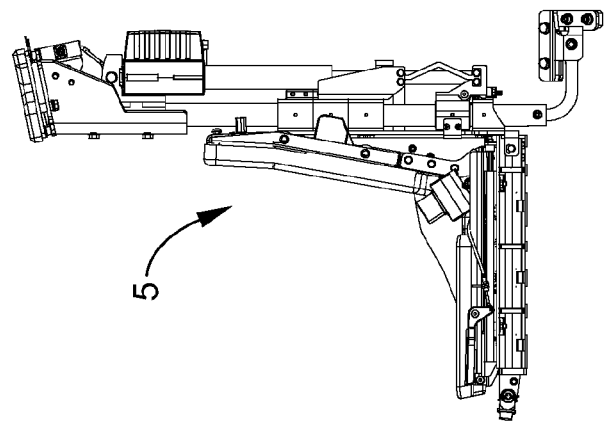
Figure 6A:
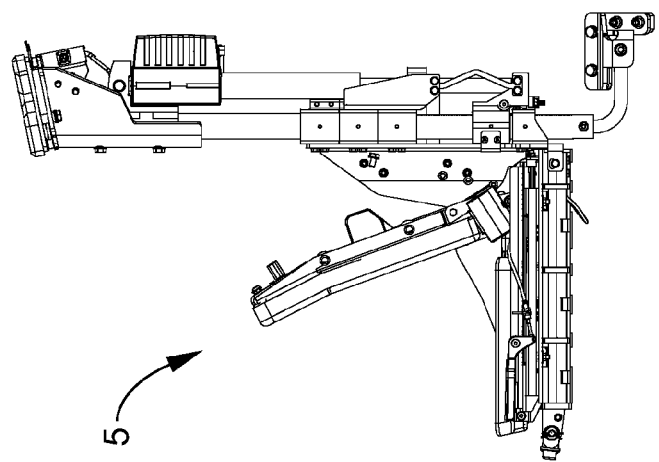

Referring now to FIGS. 6a, b, c, the seat back range of motion extends from a forward leaning position as shown in FIG. 6a, all the way back to a laid flat position as shown in FIG. 6c. The seat back can be locked at these positions, or any position in between, such as the position shown in FIG. 6b, simply by releasing lever 35 or handle 38 when the seat is at the desired position. As can be seen by referring back to FIG. 1, the main mount 7 and seat support bracket 8 are positioned to one side of the seat so as not to interfere with the seat back as it is moved over its full range of motion.

Figure 7A:
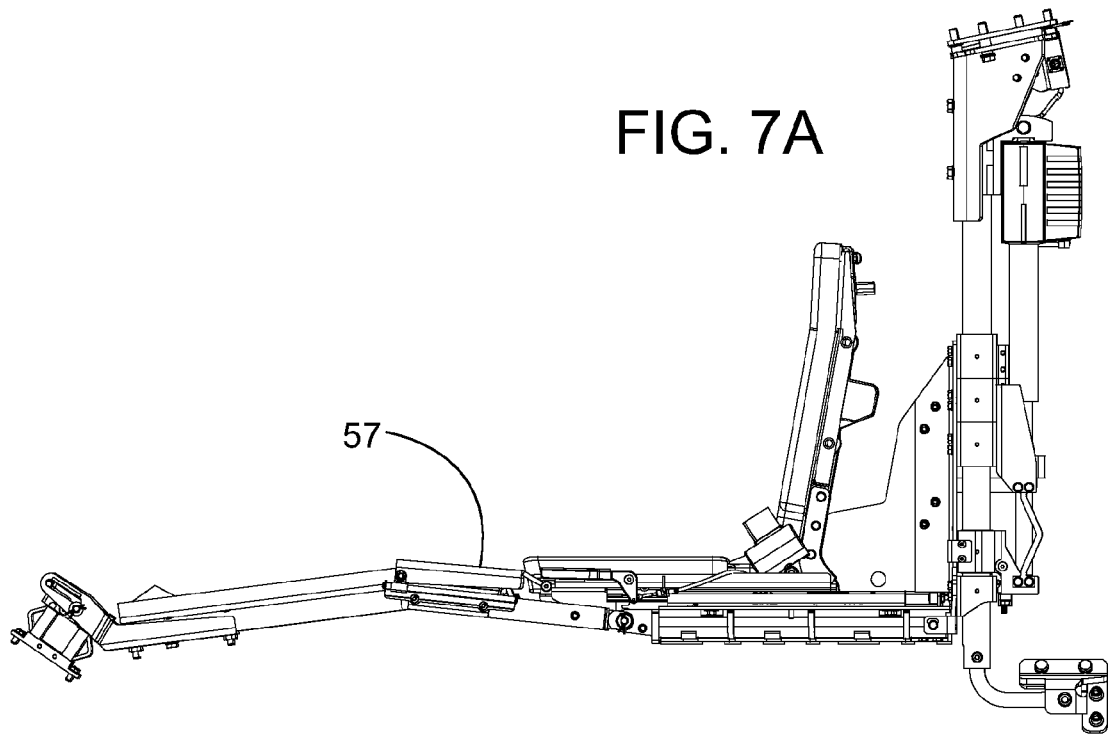
FIGS. 7a and 7b are side views showing the EA seat and seat extension platform with the seat moved forward in FIG. 7a and back in FIG. 7b.
Figure 7B:
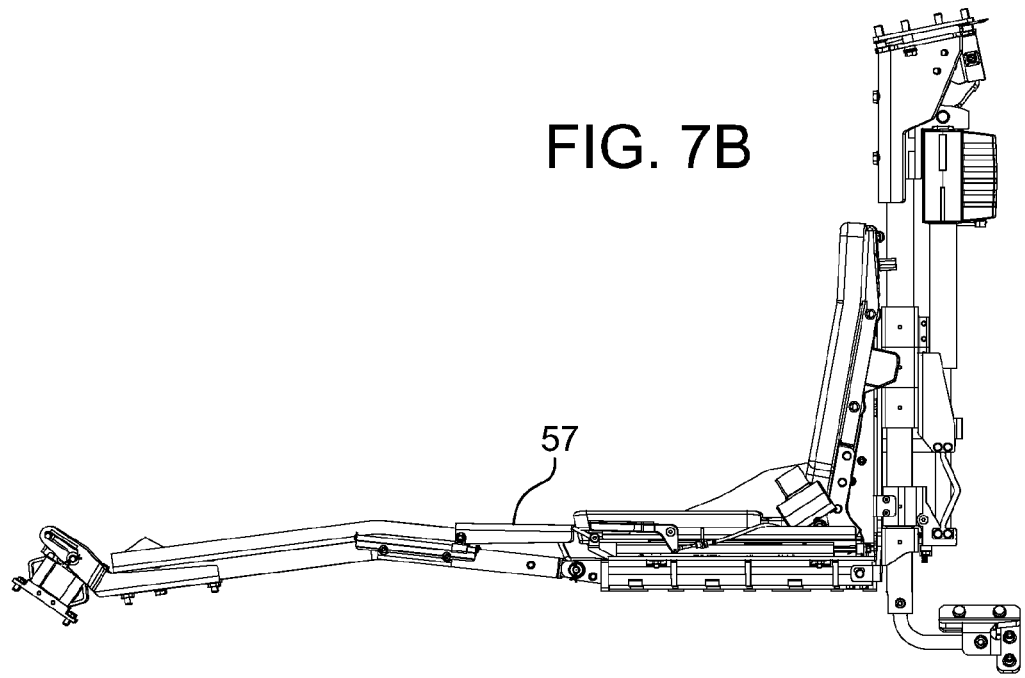
Figure 8A:
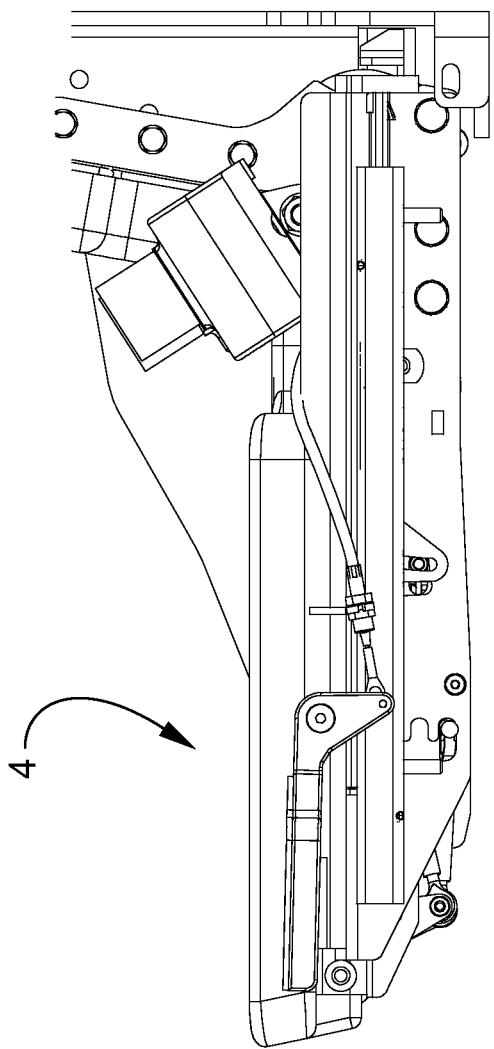
FIGS. 8a and 8b are side views showing the seat pan flat in FIG. 8a, and tilted up at an angle in FIG. 8b.
Figure 8B:
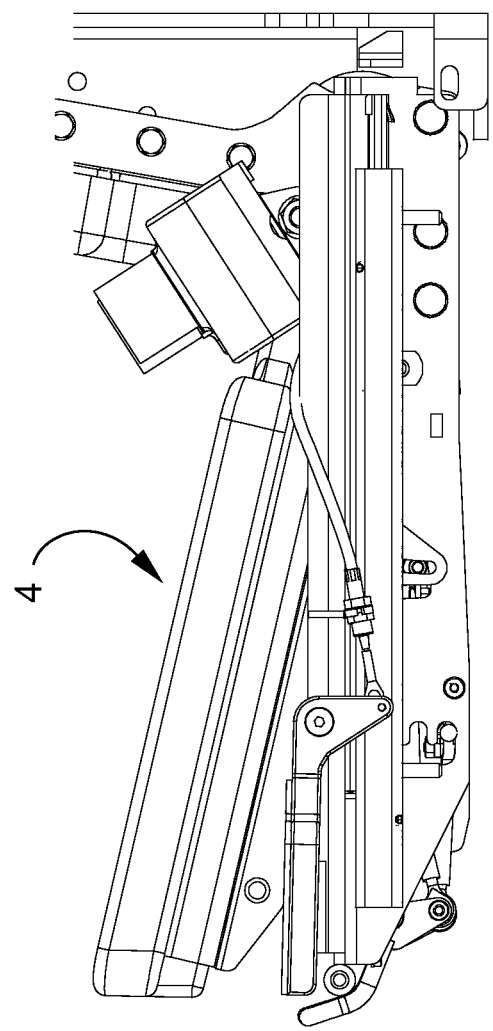

The seat pan 4 is also adjustable relative to the seat support bracket 8. Adjustment levers 39 and 40 at the front of the seat are operable to adjust the seat forward and backward, or vary the angle of just the seat pan 4 independent of the seat back angle. FIGS. 7a and 7b show the seat moved to the extreme forward and back positions by operating lever 39; and FIGS. 8a and 8b show the seat pan angle moved to the extreme up and down positions by operating lever 40. Like the seat back, seat pan 4 may be locked in a range of positions between those shown in FIGS. 7a,b and 8a,b by simply releasing the adjustment lever when the seat is in the desired position.

In addition to supporting the seat 3, the seat support bracket 8 also supports one end of an extension platform 9. Referring again to FIG. 2, the extension platform 9 comprises a floorboard 41 mounted on an elongated frame 43. The frame 43 is pivotally attached at the back end to a pair of extension platform mounting flanges 45 projecting from the front of seat support frame 8. The flanges 45 allow the extension platform 9 to pivotally move up or down relative to the seat 3 as needed to accommodate changes in the seat vertical position.

Figure 9:
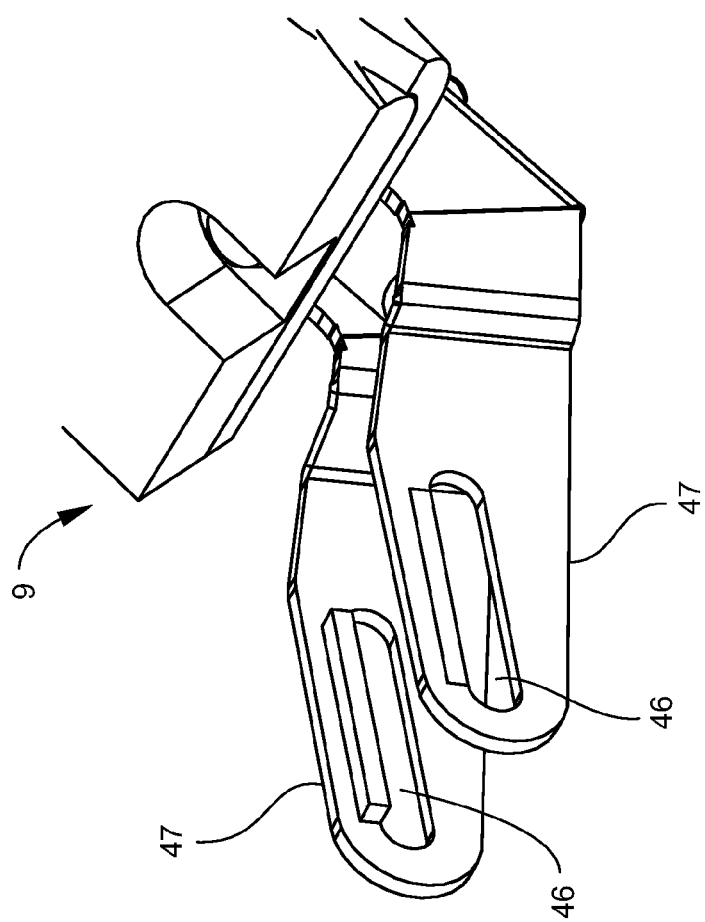
FIG. 9 is a perspective view of a forward EA mount shown separated from the forward end of the extension platform.
Figure 9:
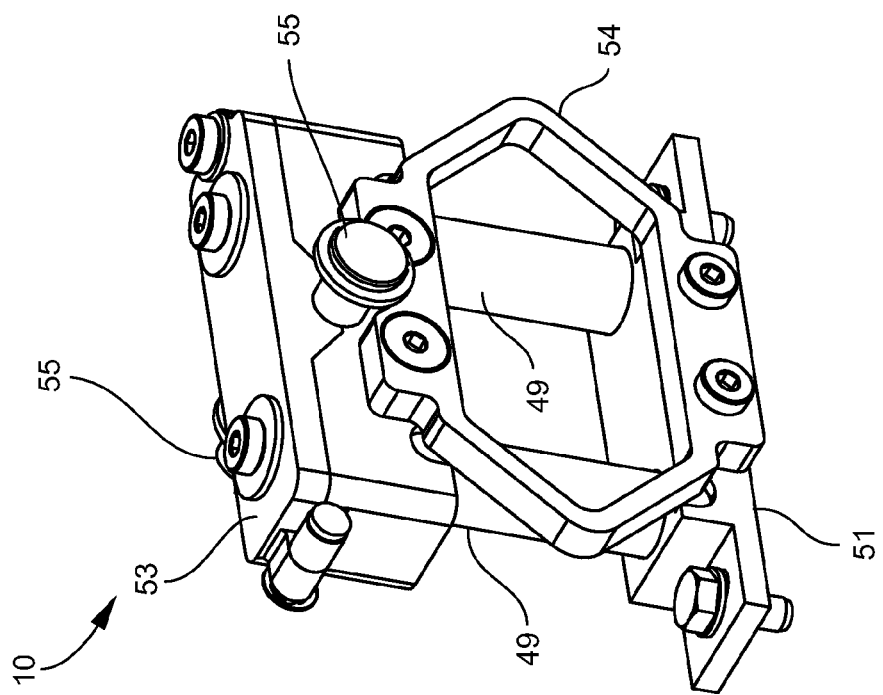

Referring now to FIG. 9, the front end of the extension platform 9 is supported from the vehicle structure by two forward EA mounts 10. The EA mounts 10 each comprise a pair of guide rods 49 extending from a base bracket 51 that is attachable to vehicle structure, such as to the floor or a bulkhead. A slide member 53 is adapted with suitable bushings so as to freely slide along rods 49. An EA link 54 connects slide member 53 to base bracket 51, rigidly fixing slide member 53 at the top of guide rods 49 under normal loading circumstances. The EA link 54 may comprise any of the mechanisms or materials already described in reference to EA links 30. In the depicted embodiment link 54 comprises a metal bar formed in a roughly six sided closed polygon shape, with two opposing sides of the polygon serving as mounting surfaces for bolting the link to the sides of bracket 51 and slide member 53.

Projecting sideways from each slide member 53 is a guide pin 55 that is received by elongated slots 46 in flanges 47 at the front end of extension platform frame 43. The guide pins 55 support and constrain the front end of extension platform 9 via slots 46 to the front EA mounts 10. Slots 46 also allow the front end of extension platform 9 to slide and pivot relative to front EA mounts 10 for accommodating any change in the distance between guide pins 55 and extension platform mounting flanges 45, or change in the angular orientation of extension platform 9, both of which may occur for example when the seat height is adjusted. The flanges 47 may extend at an angle relative to support frame 43, such as the upward angle shown in the drawings, to ensure that slot 46 is substantially parallel to slide member 53 and perpendicular to guide rods 49 over a range of seat height positions.

During a high energy impulse event, the combined inertia of the extension platform 9 and the lower extremities of the seated occupant are reacted by the EA mounts, and in particular by the EA links 54. In the same manner discussed above, when the inertia load exceeds a predetermined threshold value, the links 54 begin to collapse and absorb energy. The EA mounts 10 thus serve to protect the seated occupant, attenuating the impact forces transmitted by the vehicle hull to the occupant's legs and feet.

Figure 10:
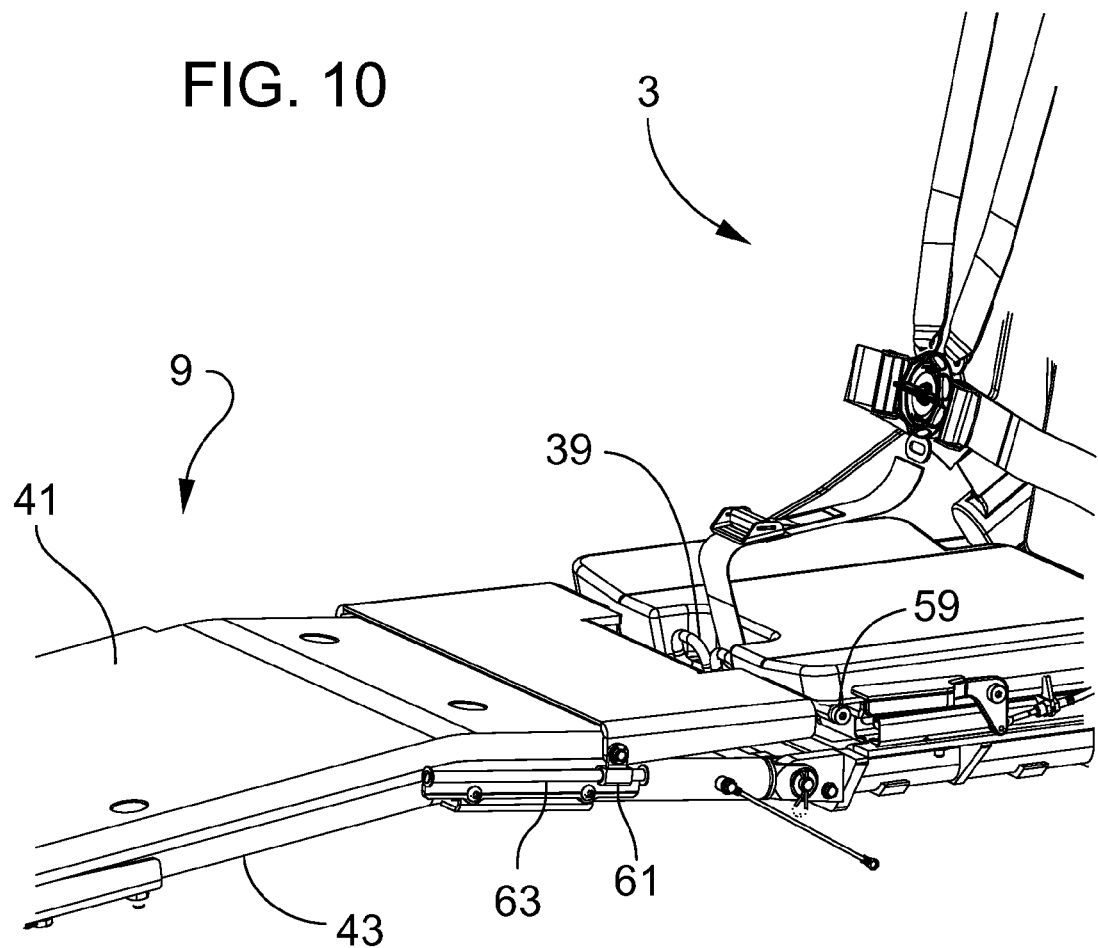
FIG. 10 is a perspective view of a portion of the EA seat and extension platform focusing on the closeout plate.

As can be seen in FIG. 2, the floorboard 41 of extension platform 9 does not extend all the way to the back end of the extension platform frame 43. The result is an open gap between the front edge of the seat 3 and the back edge of the floorboard 41 that varies in size with changes in the horizontal position of the seat. A closeout plate 57 comprising a rigid surface made of metal or other suitable durable material is used to cover the gap. Referring to FIG. 10, the back end of the closeout plate 57 is pivotally attached to the seat pan 4 at pivots 59, and the front end is slidably mounted via slides 61 to bars 63 mounted along the sides of extension platform frame 43. Thus the closeout plate moves with the seat as the seat is moved forward and backward, sliding along bars 63.

The mounting pivots and slides are also configured to hold the closeout plate in a slightly elevated position such that it can slide over the top of the floorboard 41 when the seat is moved forward. This can best be seen by again referring to FIGS. 7a, and 7b. In FIG. 7b the seat is moved to its backmost position, and the closeout plate 57 is entirely or almost entirely between the back of the floorboard and the front of the seat. In this position the closeout plate just covers the gap without substantially overlapping any part of the floorboard.

In FIG. 7a the seat is in its forward most position, and the closeout plate has been pushed forward along with it. In this position, all or substantially all of the closeout plate is overlapping the rear portion of the floorboard. The closeout plate 57 may also incorporate shock absorbing and ballistic resistant materials such as those described in reference to floorboard 41 for added protection to a seated occupant.

In operation, the seat may be adjusted to comfortably accommodate the morphology of any particular occupant. For example, the seat may be moved forward or backward as needed so that the occupant's feet comfortably reach the foot pedals in a driver compartment. The closeout plate 57 will move with the seat, increasing or decreasing the amount of overlap with the floorboard 41 of extension platform 9. Similarly the seat height can be adjusted using the adjustable length member 25 to give adequate visibility and head clearance. As the seat height is adjusted, the back end of the extension platform 9 goes up or down with it, while front end slides and pivots at the forward EA mounts 10 as needed.

The seat back angle and seat pan angle may also be adjusted, independent of each other, as needed. In addition the seat back may be tilted back all the way to a flat position as shown in FIG. 6c, for example in cases where the only way to access the seat for ingress and egress is from behind. In this manner the seat back may serve to provide an emergency exit for an otherwise trapped occupant. When using this feature for ingress, the seat back can be conveniently lowered from behind the seat using release handle 38 at the top of the seat back.

During normal vehicle operation, the seat is rigidly supported in space by the main mount 7. As previously mentioned, the weight load from the seat and occupant goes through the EA links 30, placing the EA links in a state of compression. In the case of an under-vehicle high energy impact event such as may occur from a mine blast, the vehicle hull is suddenly accelerated upward relative to the seat. Or similarly, in the case of a helicopter crash landing the downward velocity of the aircraft hull is suddenly arrested. In either circumstance the inertia of the seat is reacted through the seat mounting, including the EA links 30, adding to the normal weight load. If the inertia load is high enough, the EA links begin to collapse and absorb energy as the seat slides downward relative to the vehicle hull along column 11. As briefly mentioned, the lower ends of EA links 30 are attached to the lower end of the adjustable length support member 25, such that the entire seat weight and inertia load is carried in tension by support member 25. Consequently if the support member 25 were to fail during a high load event, the seat would then be free to slide unrestrained down column 11 without the energy attenuating benefit of EA links 30 to absorb the impact.

To prevent that possibility, the mount 7 may incorporate a failsafe device that locks the seat to the column 11 at the onset of such a catastrophic event. Referring now to FIGS. 11a and 11b, the stabilizing bushing 27 houses a failsafe lock 60 comprising generally a locking cam 62 and a sliding wedge 64 adapted to engage a series of horizontal grooves 66 in a back surface portion of column 11. The locking cam 62 and sliding wedge 64 are mounted inside bushing 27 within a channel 68 that opens toward column 11. In particular, locking cam 62 is pivotally mounted in the channel on a pin or bolt 70 received by a through-bore 72 in the upper portion of the cam, allowing the cam 62 to pivot about the pin toward or away from the column 11. Wedge 64 is disposed in the channel underneath cam 62, and biased upward against the cam by a spring 74, thereby bringing an angled surface 76 of wedge 64 to bear against a back, lower corner of cam 62.

The force applied by surface 76 tends to rotate the cam 62 toward column 11. However, as can be seen in FIG. 12a, cam 62 is prevented from pivoting toward column 11 under normal, non-catastrophic conditions by lugs 78 that project from the sides of the cam and bear against the back surface 80 of lower seat mount bushing 21. The lugs 78 thus act to hold the cam away from column 11, and maintain a gap between one or more splines 63 of cam 62 and the grooves 66 in column 11 under normal operating conditions.

In a high load event, the seat, along with upper and lower bushings 19, 21, begin to stroke downward along column 11. However the stabilizing bushing 27 and locking device 60 are held vertically fixed in space by the adjustable length support member 25, and thus do not move relative to column 11. As a result, lower bushing 21 begins to move downward with the seat relative to locking device 60, causing the lugs 78 of cam 62 to ride up surface 80 of bushing 21. Referring to FIG. 12b, when lugs 78 clear the top edge of bushing 21 there is no longer anything to resist the force being exerted against the back of the cam by wedge 64, and the cam is driven forward into contact with column 11, bringing splines 63 into locking engagement with grooves 66.

As long as the adjustable length support member 25 remains intact, the inertia load of the seat continues to be reacted through member 25, and the cam 62 does not share any of the load, despite having moved into contact with the grooved surface of column 11. However if the support member 25 were to then fail, or the stabilizing bushing 27 otherwise become disconnected from support member 25, the bushing 27 and locking device 60 will be driven downward by EA links 30 relative to column 11. Because the locking device is engaged, the downward load applied to stabilizing bushing 27 will result in a downward force applied to cam 62 by bushing 27 at pin 70, and an equal and opposite upward force applied by grooves 66 against splines 63. The two loads are offset, creating a couple that attempts to continue rotating the cam, and thereby drive cam 62 and splines 63 against column 11 with a force that increases in proportion to the applied load. Accordingly, the greater the downward inertia force applied by the seat to bushing 27, the more tightly locking device 60 grips column 11. In this manner the locking device prevents further downward motion of bushing 27 and seat 3 by locking the bushing to column 11, and thereby once again fixing the lower ends of the EA links 30 through a direct load path to the vehicle structure. However in this case the load path is through column 11 rather than through the adjustable length support member 25.

As the seat moves downward along column 11 during a high energy EA event, the back end of extension platform 9 moves downward with it. The forward end of extension platform 9 simultaneously slides and pivots as needed at pins 55 of the forward EA mounts 10 to accommodate the downward motion of the back end. Also at the same time the forward EA mounts 10 operate to react the inertia load of the extension platform 9 and the lower extremities of the seated occupant, collapsing and absorbing energy as the front end of extension platform 9 and slide member 53 stroke downward relative to the vehicle. The forward EA mounts 10 thus provide energy attenuation during an EA event for the occupant's lower extremities that is independent of the seat EA support and stroking motion of the seat in such an event.

Further description and characteristics of an energy attenuating seat and seat extension in accordance with the present disclosure are provided in Attachment A and Attachment B both submitted herewith, the entire contents of which are hereby incorporated by reference.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An energy attenuating vehicle seat, comprising:
a substantially vertically oriented support column, at least one end thereof rigidly fixed to the vehicle structure;
upper and lower spaced apart seat mount bushings attached to the seat and slidably mounted to the support column, the seat connected to the upper and lower seat mount bushings in a cantilevered manner by a seat support bracket that supports the seat from under a seat pan, wherein a tilt angle of both the seat pan and a seat back are independently adjustable; and
an energy attenuating linkage comprising an elongated seat support member with a first end thereof anchored to the vehicle structure, and a deformable energy attenuating link disposed between a second end of the seat support member and the upper seat mount bushing.

2. The energy attenuating vehicle seat of claim 1, wherein the column and the energy attenuating linkage are offset to one side of the seat with sufficient clearance for the seat back to recline all the way to a laid flat position without interference.

3. The energy attenuating vehicle seat of claim 2, further comprising a seat back release handle located on the back of the seat, and operable from behind the seat to recline the seat.

4. The energy attenuating vehicle seat of claim 1, wherein the length of the elongated seat support member is adjustable, and the vertical seat position is determined by the length of the seat support member.

5. The energy attenuating vehicle seat of claim 4, wherein the elongated seat support member is a ball screw type linear actuator.

6. An energy attenuating vehicle seat, comprising:
a substantially vertically oriented support column, at least one end thereof rigidly fixed to the vehicle structure;
upper and lower spaced apart seat mount bushings attached to the seat and slidably mounted to the support column;
an energy attenuating linkage comprising an elongated seat support member with a first end thereof anchored to the vehicle structure, and a first deformable energy attenuating link disposed between a second end of the seat support member and the upper seat mount bushing; and
a seat extension platform connected at a back end thereof to a front end of the seat, and connected at a front end thereof to the vehicle structure through a forward energy attenuating mount, wherein the seat extension platform comprises an energy absorbing or ballistic resistant floorboard atop a frame.

7. The energy attenuating vehicle seat of claim 6, wherein the forward energy attenuating mount comprises:
a base bracket attached to the vehicle structure;
a pair of parallel guide rods extending away from the base bracket;
a top bracket slidably mounted to the guide rods; and
a second deformable energy attenuating link disposed between the top bracket and the base bracket.

8. The energy attenuating vehicle seat of claim 7, wherein the front end of the seat extension platform is connected to the forward energy attenuating mount by means of a flange extending from the front end of the extension platform frame in a direction substantially perpendicular to the guide rods, the flange having an elongated slot that is slidably disposed about a guide pin in the top bracket, whereby the extension platform is free to move back and forth relative to the forward energy attenuating mount via the flange sliding along the pin.

9. An energy attenuating vehicle seat, comprising:
a substantially vertically oriented support column, at least one end thereof rigidly fixed to the vehicle structure;
upper and lower spaced apart seat mount bushings attached to the seat and slidably mounted to the support column;
an energy attenuating linkage comprising an elongated seat support member with a first end thereof anchored to the vehicle structure, and a deformable energy attenuating link disposed between a second end of the seat support member and the upper seat mount bushing; and
a locking device that locks the seat to the support column during a high energy loading event, wherein the locking device comprises a cam with splines that engage grooves in the support column.

10. The energy attenuating vehicle seat of claim 9, wherein the locking device further comprises a spring-loaded wedge that bears against the cam, urging the cam toward the support column.

11. An energy attenuating vehicle seat, comprising:
a substantially vertically oriented support column, at least one end thereof rigidly fixed to the vehicle structure;
a seat mount bracket that slidably attaches the seat to the support column;
an energy attenuating linkage connecting the seat to the vehicle structure;
a seat extension platform having a back end and a front end, wherein the back end is pivotally connected to the seat, and the front end is supported by the vehicle structure through a forward energy attenuating mount, and wherein the forward energy attenuating mount comprises a first deformable energy attenuating link operatively connected at one end to the seat extension platform, and at the other end to the vehicle structure.

12. The energy attenuating vehicle seat of claim 11, wherein the energy attenuating linkage comprises an elongated seat support member and a second deformable energy attenuating link, disposed between a lower end of the elongated seat support member and the seat mount bracket.

13. The energy attenuating vehicle seat of claim 12, wherein the seat mount bracket slidably attaches the seat to the support column by means of upper and lower spaced apart seat mount bushings that are fixed to the seat mount bracket and slidably mounted to the support column.

14. The energy attenuating vehicle seat of claim 13, wherein the second deformable energy attenuating link is operatively connected at one end to the upper seat mount bushing, and at the other end to the lower end of the elongated seat support member.

15. An energy attenuating vehicle seat, comprising:
a substantially vertically oriented support column, at least one end thereof rigidly fixed to the vehicle structure;
a seat mount bracket that slidably attaches the seat to the support column;
an energy attenuating linkage connecting the seat to the vehicle structure;
a seat extension platform having a back end and a front end, wherein the back end is pivotally connected to the seat, and the front end is supported by the vehicle structure through a forward energy attenuating mount; and
a locking device that locks the seat to the support column during a high energy loading event, wherein the locking device comprises a cam with splines that engage with a series of grooves in the support column.

* * * * *